July 27, 1926.
A. AULETTA
1,594,329
DOOR OPERATING MECHANISM
Filed June 10, 1924  2 Sheets-Sheet 1
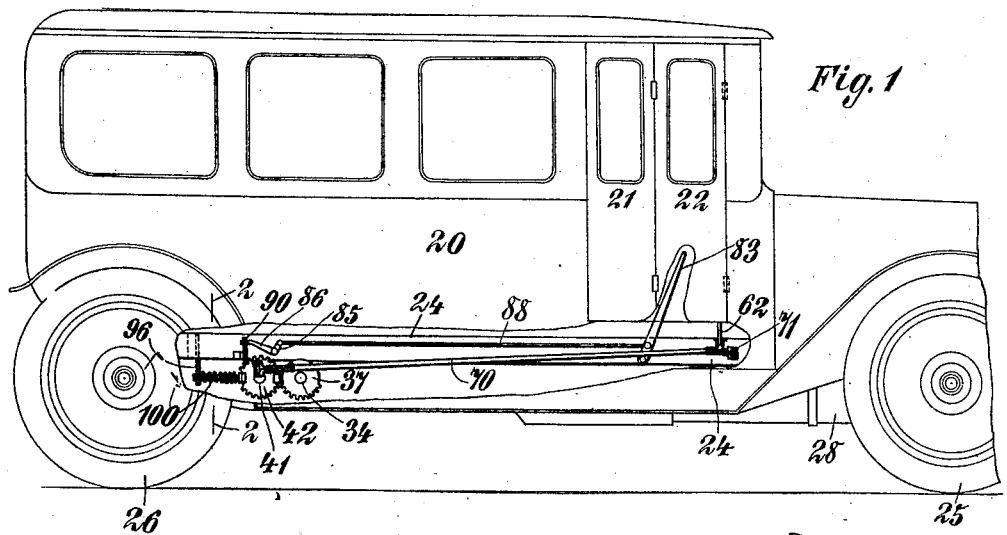
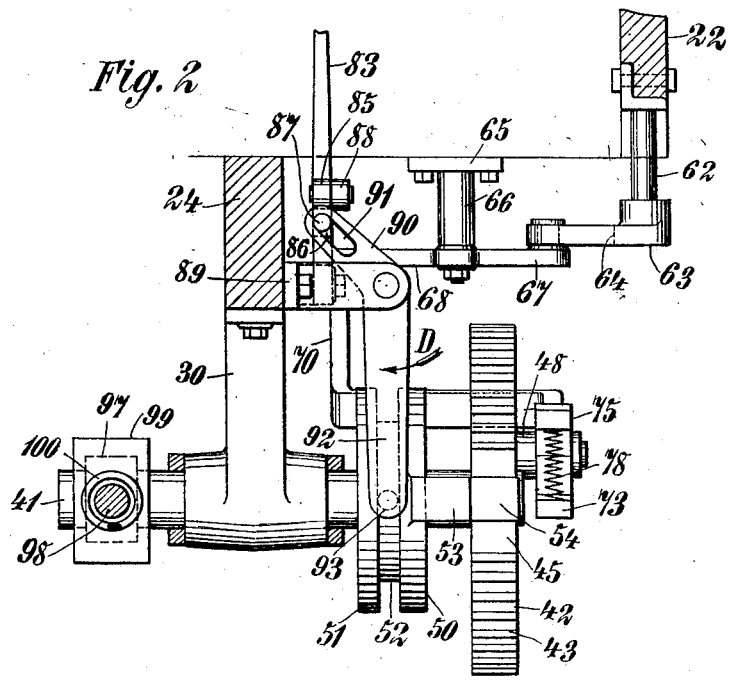
INVENTOR
Alfred Auletta.
BY
ATTORNEY

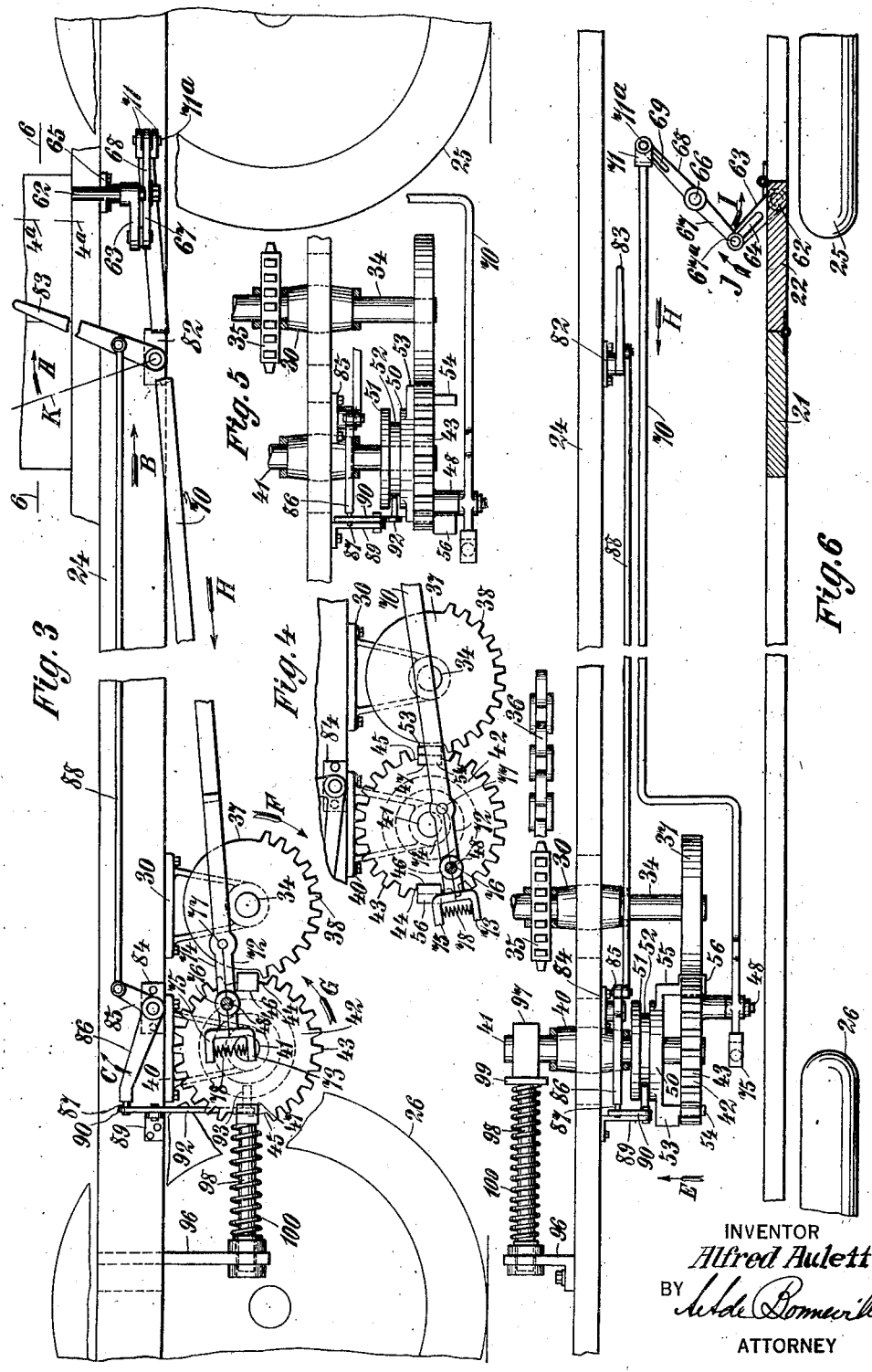

Patented July 27, 1926.

1,594,329

UNITED STATES PATENT OFFICE.

ALFRED AULETTA, OF BAYONNE, NEW JERSEY, ASSIGNOR OF ONE-FOURTH TO PETER PARIS, ONE-FOURTH TO GAETANO MEROLA, AND ONE-FOURTH TO JOHN A. LUTHER, ALL OF BAYONNE, NEW JERSEY.

DOOR-OPERATING MECHANISM.

Application filed June 10, 1924. Serial No. 719,086.

This invention relates to a door operating mechanism. It is specially applicable to a vehicle like a jitney-bus, the door of which must be opened and closed many times during its use.

The object of the invention is the production of a mechanism, by means of which the effort required to open and close a door is reduced to a minimum.

The second object of the invention is the production of a mechanism whereby the principal effort to open and close a door is derived from a motor. A third object of the invention is to provide automatic means, to prevent injury to its mechanism when some of the elements thereof become inoperative. A fourth object is the production of an automatically operated locking device, whereby the moving elements are locked in position, after the door of the jitney-bus is opened or closed.

Fig. 1 represents a side elevation of the door operating mechanism connected to a jitney-bus; Fig. 2 shows a partial enlarged section of Fig. 1 on the line 2, 2; Fig. 3 indicates an enlarged portion of Fig. 1; Fig. 4 shows a fragmentary portion of Fig. 3 with some of the elements in a changed position; Fig. 5 represents a top plan view of Fig. 4 and Fig. 6 shows a top plan view and section of Fig. 3 on the line 6, 6.

A jitney-bus is indicated with its body 20, that has hinged thereto the door, comprising the hinged portion 21 and 22. One of the floor beams of the bus is indicated at 24. Front wheels 25 and rear wheels 26 support the bus, which is driven by a motor, a portion of which is indicated at 28.

A journal bracket 30 extends from the lower face of the floor beam 24 and is fastened thereto. A driving shaft 34 is journaled in the bracket 30. A sprocket chain wheel 35, in this instance, is fastened to one end of the shaft 34 and a sprocket chain 36 connects the shaft 34 to the motor 28. To the other end of the shaft 34 is fastened the segmental gear 37, having the teeth 38. A second journal bracket 40 extends from the lower face of the floor beam 24, and is fastened thereto. A second shaft 41 is journaled in the journal bracket 40, and has fastened thereto the spur gear 42 having the teeth 43. Diametrically opposite portions 44 and 45 of the spur gear 42 are devoid of teeth. Slide bearing faces 46 and 47 are respectively formed in the portions 44 and 45. A wrist pin 48 extends from the spur gear 42. On the shaft 41 is slidably supported a clutch member having the body portion 50 and the flange 51, with the annular groove 52 between them. A tooth is indicated with the thick portion 53 and the outwardly extending thin portion 54. The thick portion 53 extends from the body portion 50 of the clutch member. A second tooth is indicated with the thin portion 55 and the outwardly extending thick portion 56. The thin portion 55 extends from the body portion 50 of the clutch member. The said teeth constitute slidable teeth for the spur gear 42. The tooth with the portions 53 and 54 is adapted to slide on the bearing face 47 of the spur gear 42, and the tooth having the portions 55 and 56 adapted to slide on the bearing face 46 of said spur gear.

A pin 62 extends from the lower edge of the portion 22 of the door of the jitney-bus, and has in turn fastened thereto the crank arm 63 having the elongated slot 64. A bracket 65 extends from the lower face of the floor of the bus and has extending therefrom the pivot post 66. To the latter is pivoted the lever having the arms 67 and 68. The arm 67 has extending therefrom the pin 67$^a$ which is engaged by the slot 64. The arm 68 has formed therein the elongated slot 69.

A connecting rod 70 has formed at one end the bifurcated end 71 with the pin 71$^a$, which latter is engaged by the slot 69. The other end of the connecting rod 70 has formed therewith the flexible member 72 having the hook end 73, and the flexible member 74 having the hook end 75. A journal bearing 76 and an opening 77 are formed with the members 72 and 74. The journal bearing 76 engages the wrist pin 48. A spring 78 connects the hook ends 73 and 75. By means of the flexibility of the members 72 and 74 of the connecting rod 70, the said members will separate and ride on the wrist-pin 48, if for any reason the door having the portions 21 and 22 remains stationary when the spur gear 42 turns, and thereby prevent injury to the mechanism.

A journal bracket 82 extends from the floor beam 24, and has pivoted thereto one end of the operating handle 83. A journal bracket 84 extends from the floor beam 24 and has pivoted thereto the bell-crank with the arms 85 and 86. The latter has extending therefrom the pin 87. A connecting rod 88 has its ends respectively pinned to the operating handle 83 and the arm 85. An angle shaped journal bracket 89 extends from the floor beam 24, and has pivoted to its outer end the bell-crank with the arm 90 having the elongated opening 91 and the arm 92 with the clutch pin 93. The latter engages the annular groove 52 of the clutch member and the opeinng 91 engages the pin 87.

A bracket 96 extends from the floor beam 24. A rectangular locking block 97 is fastened to the shaft 41. A slidable pin 98 has extending from one end the locking plate 99 and its other end extends through an opening in the bracket 96. The plate 99 can bear against any of the four faces of the block 97. A spring 100 encircles the pin 98 and bears between the plate 99 and the bracket 96.

The coaction of the locking plate 99 and the locking block 97 automatically maintains the spur gear 42 in position after each turn of a one half revolution, and thereby through the interposed elements, maintains the door of the jitney-bus either opened or closed.

To use the mechanism, it may be supposed that the door having the hinged portions 21 and 22 is located in its closed position, as best shown in Fig. 6, the locking block 97 and locking plate 99 automatically maintaining the movable elements in a fixed position as best shown in Figs. 3 and 6. The operating handle is now swung forward as shown in Fig. 3, in the direction of the arrow A to open the door. By this means the connecting rod 88 has been moved in the direction of the arrow B, which has swung the arm 86 in the direction of the arrow C. By this means the arm 92 has been swung in the direction of the arrow D, and the clutch member with the body portion 50 has moved in the direction of the arrow E, to locate the thick portion 56 of one of its teeth in the path of the teeth 38 of the segmental gear 37, as best shown in Fig. 3. The wheel 35 continuously turns the segmental gear 37 in the direction of the arrow F, and the spur gear 42 is turned in the direction of the arrow G, for one half of a turn as shown in Figs. 4 and 5. The tooth having the portions 53 and 54 will be revolved 180 degrees, and the thin portion 54 thereof will allow the segmental gear 37 to keep on turning. During the one half turn of the spur gear 42 just described, the connecting rod 70 will move in the direction of the arrow H. The lever having the arms 67 and 68 will swing with its arm 67 taking the direction of the arrow I. By this means the crank arm 63 will swing in the direction of the arrow J, and the door of the jitney-bus will be opened.

If the user wishes to close the door of the jitney-bus, the operating handle 83 is swung to the position shown by the dotted line K in Fig. 3, and the connecting rod 88 will move in the direction opposite to the arrow B. The arm 86 of the bell-crank pivoted to the journal bracket 84, will swing in a direction opposite to the arrow C, and the bell-crank having the arms 90 and 92 will swing with the arm 92 taking a direction opposite to the arrow D. The clutch member having the body portion 50 will move in a direction opposite to the arrow E, and the thick portion 53 which has been revolved with one half turn of the spur gear, 42, as shown in Figs. 4 and 5, will be adjacent to the segmental gear 37 and in the path of the teeth 38 thereof. The wrist-pin 48 will now cause the connecting rod 70 to move in a direction opposite the arrow H, and the arm 63 will swing in a direction opposite to the arrow J, and the door of the jitney-bus will be closed.

This invention has been shown and described for a swinging door, but it is to be understood that it can also be applied to a sliding door.

Various modifications may be made in the invention and the present exemplification is to be taken as illustrative and not limitative thereof.

Having described my invention what I desire to secure by Letters Patent and claim is:

1. The combination of a door, a segmental gear, a motor to turn said segmental gear, a spur gear with its teeth meshing with the teeth of the segmental gear, a pair of slidable teeth diametrically and oppositely positioned on the spur gear, means to move said teeth in and out of mesh with the teeth of the segmental gear and connecting means between said second gear and the door.

2. The combination of a door adapted to swing, a segmental gear, a motor to turn said gear, a spur gear meshing with said segmental gear, a pair of slidable teeth diametrically and oppositely positioned on said spur gear, each of said teeth having a thick portion adapted to mesh with the teeth of the segmental gear and a thin portion adapted to clear the teeth of the segmental gear, means to move the slidable teeth to locate their thick portions alternately in line with the other teeth of the spur gear and means connecting the spur gear and said door.

3. The combination of a door adapted to swing, a segmental gear, a motor to turn said gear, a spur gear meshing with said segmental gear, a pair of slidable teeth diametrically and oppositely positioned on said spur gear, each of said teeth having a thick portion adapted to mesh with the teeth of the segmental gear and a thin portion adapted to clear the teeth of the segmental gear, means to move the slidable teeth to locate their thick portions alternately in line with the other teeth of the spur gear, a crank arm extending from the door and a lever pivoted in the jitney-bus having a pair of arms, one of the arms of the lever connected to said crank arm and a connecting rod with one end connected to the spur gear and its other end connected to the other arm of said lever.

4. The combination of a door adapted to swing, a segmental gear, a motor to turn said gear, a spur gear meshing with said segmental gear, a pair of slidable teeth diametrically and oppositely positioned on said spur gear, each of said teeth having a thick portion adapted to mesh with the teeth of the segmental gear and a thin portion adapted to clear the teeth of the segmental gear, means to move the slidable teeth to locate their thick portions alternately in line with the other teeth of the spur gear, a crank arm extending from the door, a lever pivoted in the jitney-bus having a pair of arms, one of the arms of the lever connected to the crank arm, a connecting rod having a pair of flexible members at one end with a journal bearing formed between them, and a wrist-pin extending from the spur gear seated in the journal bearing of said flexible member, and the other end of the connecting rod connected to the other arm of said lever.

5. In a door operating mechanism the combination of a door adapted to swing, a segmental gear journaled in the mechanism, a motor to turn said gear, a spur gear meshing with said segmental gear, a shaft supporting the spur gear, said spur gear having a pair of bearing faces diametrically and oppositely formed therewith and in line with the teeth thereof, a clutch member slidably supported on the shaft of the spur gear and having a pair of teeth each with a thick portion and a thin portion extending therefrom, said teeth adapted to slide on the bearing faces of the spur gear, the thick portion of each tooth adapted to be located in line with the teeth of the spur gear, to mesh with the teeth of the segmental gear and the thin portion adapted to clear the teeth of the segmental gear, an operating handle, connections between said handle and the clutch member to move the latter, and connecting means between said spur gear and said door.

6. In a door operating mechanism the combination of a door adapted to swing, a segmental gear journaled in the mechanism, means to turn the said gear, a spur gear meshing with said segmental gear, a shaft supporting the spur gear, a pair of slidable teeth positioned on said spur gear adapted to be located to mesh with the teeth of the segmental gear, means to move said teeth, means connecting the second spur gear and said door and automatic means to lock the shaft of the spur gear in position after each half rotation thereof.

Signed at Bayonne in the county of Hudson and State of New Jersey this 23d day of May A. D. 1924.

ALFRED AULETTA.